United States Patent Office 2,932,645
Patented Apr. 12, 1960

2,932,645

N-(DIALKYLAMINOMETHYL)BENZILIC AMIDES

Wooten Taylor Sumerford and Frederick A. Grunwald, Evansville, Ind., assignors to Mead Johnson & Company, Evansville, Ind., a corporation of Indiana No Drawing. Application December 12, 1957
Serial No. 702,222

6 Claims. (Cl. 260—294)

This invention relates to new compositions having valuable therapeutic and pharmacological properties and more particularly to N-(dialkylaminomethyl) derivatives of benzilic amide and to methods of preparing them.

Generally the compositions of the present invention are those of the structural formula:

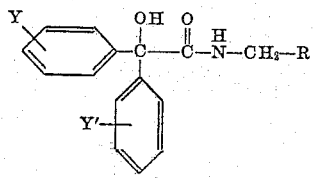

wherein Y and Y' are radicals selected from the group consisting of hydrogen, halogen (such as chlorine, bromine and iodine) and lower alkyl (such as methyl, ethyl, propyl or butyl) and R is a radical selected from the group consisting of dialkyl amino radicals and cycloalkyl amino radicals. In a most preferred form of the present invention the R group is preferably an amino radical of the structure

wherein $R_1$ and $R_2$ are lower alkyl radicals each containing from 1 to 6 carbon atoms which may be joined at their terminus to form a heterocyclic ring such as a pyrrolidine or a piperidine ring.

The nontoxic and physiologically active acid addition and quaternary ammonium salts of these compounds are also contemplated as a part of the present invention.

The above described compositions have unusual and unexpected utility in the relief of muscular tremors and convulsive disorders in animals. Certain of them are also useful as bacteriostatic agents and sedatives. The dosage for mammals is from about 1 to about 28 milligrams per kilogram of body weight per day administered in appropriate portions from one to four times daily. These compounds may be administered orally in the form of tablets, wafers, elixirs, liquid suspensions, powders, capsules or the like, or intravenously in solutions.

The products of this invention are obtained as oils or solids which may readily be handled and administered as the free base or as the hereinafter described salts.

In one embodiment, the compositions of the present invention are prepared by a Mannich type condensation of benzilic acid amide, formaldehyde and a secondary amine. The reaction is carried out by combining the above reactants followed by heating. The product formed may be either solid or in the form of a viscous oil. Where the product is an oil, the compound may be advantageously converted to a nontoxic acid addition salt such as, for example, the hydrochloride prior to purification.

With reference to the secondary amine reactant, it should be understood that this includes lower dialkyl secondary amines wherein the substituents are dialkyl groups such as in diethylamine or dipropylamine, and also where the alkyl substituents are formed into a heterocyclic amine in conjunction with the amino nitrogen such as in pyrrolidine or piperidine. The reactants are preferably combined in at least equimolar quantities and with respect to the formaldehyde and the secondary amine an excess of these reactants is preferred. The process may be carried out in alcohol solvent such as methanol utilizing mild heating. Other relatively inert and nonreactive solvents may also be used. Refluxing is a convenient procedure for carrying out the condensation process of this invention.

The following equation will illustrate the general sequence of the condensation process of the present invention:

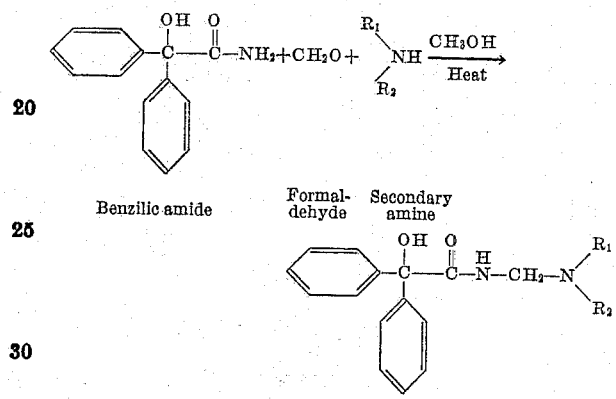

Benzilic amide     Formaldehyde   Secondary amine

N-(dialkylaminomethyl)benzilic amide wherein $R_1$ and $R_2$ are lower alkyl radicals containing 1 to 6 carbon atoms which may be joined at their terminus to form a heterocyclic ring such as a pyrrolidine or a piperidine ring. The dialkyl substituted piperidine radicals such as the 2,6-dimethyl piperidyl radical are preferred in the compounds of this invention.

The acid addition and quaternary ammonium salts of the above described compounds may be prepared by conventional techniques. For example, bubbling gaseous anhydrous hydrogen chloride into an ether solution of the tertiary amine base is a suitable method for preparing the hydrochloride salt. Other suitable acid addition salts of these compounds are hydrobromides, hydroiodides, sulfates, phosphates, acetates, citrates, succinates, tartrates, and the like. Suitable quaternary ammonium salts are those which may be obtained by the addition of nontoxic organic or inorganic esters or alkyl halides to the base compound. Exemplary of these ester and alkyl halide materials are methyl chloride, methyl bromide, methyl iodide, ethyl bromide, propyl chloride, benzylchloride, benzyl bromide, methyl sulfate, methyl benzene sulfonate, methyl paratoluene sulfonate, or the like.

The following examples will specifically illustrate the preparation of the representative compositions contemplated by this invention:

EXAMPLE 1

*N-(diethylaminomethyl)benzilic amide hydrochloride*

A solution of 30.8 grams (0.136 mole) of benzilic amide, 20 milliliters of 35–40% formaldehyde (Eastman tech.), and 11.0 grams (0.150 mole) of diethylamine (Eastman) in 500 milliliters of absolute methanol was placed in a one liter flask fitted with a reflux condenser and permitted to stand at normal room temperature overnight (about 14 hours). The reaction mixture was then heated under moderate reflux for four hours. The methanol solvent was then evaporated under the reduced pressure of a water pump aspirator and the resulting viscous residue was taken up in 500 milliliters of diethyl ether (U.S.P.). The ethereal solution was washed with five 200 milliliter portions of water, dried over anhydrous MgSO$_4$, and saturated with dry hydrogen chloride to produce the crude hydrochloride salt. The salt was obtained initially as an oil; treatment of the separated oil with 300 milliliters of anhydrous ether and a few milliliters of 95% ethanol gave 27.6 grams of a white solid, melting point 138–46° C. Recrystallization was effected by solution of the crude material in a mixture of 300 milliliters of acetone and 35 milliliters of absolute methanol, filtration of this solution, and dilution with 350 milliliters of anhydrous ether. The yield of purified material was 19.15 grams (40%), melting point 146–148° C. (decomposes). Further recrystallization did not improve the melting point.

*Analysis.*—Calcd. for C$_{19}$H$_{24}$N$_2$O$_2$·HCl: N, 8.03. Found: N, 8.08.

EXAMPLE 2

*N-(dipropylaminomethyl)benzilic amide*

In a reaction analogous to that employed in Example 1 except for the formation of the hydrochloride from 13.6 grams (0.06 mole) of benzilic amide, 12 milliliters of 35% formaldehyde, and 6.7 grams (0.066 mole) of di-n-propylamine in 200 milliliters of absolute methanol, there was obtained 18.5 grams of crude N-(dipropylaminomethyl)benzilic amide, melting point 95–99° C. Recrystallization of the crude material from ethanol-water, then from benzene-Skelly F, and again from ethanol-water, gave 12.3 grams (60%) of white crystalline product, melting point 106.5–107.5° C.

*Analysis.*—Calcd. for C$_{21}$H$_{28}$N$_2$O$_2$: N, 8.23. Found: N, 8.34.

EXAMPLE 3

*N-(1'pyrrolidylmethyl)benzilic amide hydrochloride*

This compound was prepared by a method similar to that employed in Example 1, using pyrrolidine in place of diethylamine. The hydrochloride of the product, N-(1'-pyrrolidylmethyl)benzilic amide hydrochloride, was obtained as a white crystalline solid, melting point 195–197° C. (decomposes).

*Analysis.*—Calcd. for C$_{19}$H$_{22}$N$_2$O$_2$·HCl: N, 8.08. Found: N, 8.04.

EXAMPLE 4

*N-(dimethylaminomethyl)benzilic amide hydrochloride*

This substance was prepared by the general method employed in Example 1 using dimethylamine in place of diethylamine. The hydrochloride of the tertiary amine base was obtained as a colorless crystalline solid, melting point 173–176° C. (from absolute ethanol-ether).

*Analysis.*—Calcd. for C$_{17}$H$_{20}$N$_2$O$_2$·HCl: N, 8.73. Found: N, 8.94.

EXAMPLE 5

*N-(1-piperidylmethyl)benzilic amide*

This compound was prepared by the same procedure used in Example 2 except for the use of piperidine in place of dipropylamine. The tertiary amine base was obtained as a white crystalline solid, melting point 124.0–126.5° C. (from methanol-water).

*Analysis.*—Calcd. for C$_{20}$H$_{24}$N$_2$O$_2$: N, 8.64. Found: N, 8.64, 8.66.

EXAMPLE 6

*N-(2,6-dimethyl-1-piperidylmethyl)benzilic amide hydrochloride*

This compound was prepared by a procedure analogous to that used in Example 1, except for the use of 2,6-dimethylpiperidine in place of diethylamine. The hydrochloride of the tertiary amine base was obtained as white crystals, melting point 163–170° C. (decomposes) (from methanol-ether).

*Analysis.*—Calcd. for C$_{22}$H$_{28}$N$_2$O$_2$·HCl: N, 7.20. Found: N, 6.89, 6.89.

EXAMPLE 7

*N-(dibutylaminomethyl)benzilic amide*

The method of preparation for this compound was analogous to that used in Example 2, with the exception that dibutylamine was used in place of dipropylamine. The tertiary amine base was obtained as waxy, white crystals, melting point 87.5–89.0° C. (from ethanol-water).

*Analysis.*—Calcd. for C$_{23}$H$_{32}$N$_2$O$_2$: N, 7.60. Found: N, 7.69, 7.72.

EXAMPLE 8

*N-(diethylaminomethyl)-4,4'-dichlorobenzilic amide hydrochloride*

This compound was prepared by the same procedure used in Example 1, utilizing 4,4'-dichlorobenzilic amide in place of the unsubstituted benzilic amide. The compound was obtained eventually as a white crystalline material, melting point 143.5–146.5° C. (from chloroform-ether).

*Analysis.*—Calcd. for C$_{19}$H$_{22}$Cl$_2$N$_2$O$_2$·HCl: N, 6.71. Found: N, 6.70, 6.51.

EXAMPLE 9

*N-(diethylaminomethyl)-2-methylbenzilic amide hydrochloride*

The method of preparation for this compound was analogous to that used in Example 1, with the exception that 2-methylbenzilic amide was used in place of the unsubstituted benzilic amide. The compound was obtained as white crystalline material, having melting point 162–165° C. (from absolute methanol-ether).

*Analysis.*—Calcd. for C$_{20}$H$_{26}$N$_2$O$_2$·HCl: N, 7.72. Found: N, 7.68, 7.65.

EXAMPLE 10

*N-(diethylaminomethyl)benzilic amide methobromide*

This quaternary salt was prepared from the free tertiary amine base N-(diethylaminomethyl)benzilic amide, as prepared in Example 1, by treatment with excess methylbromide in acetonitrile. The product was obtained as white crystals, having melting point 161–163° C. (from acetonitrile-ether).

*Analysis.*—Calcd. for C$_{20}$H$_{27}$BrN$_2$O$_2$: N, 6.88. Found: N, 6.85, 6.90.

While the foregoing examples specifically illustrate the production of the base compositions and some hydrochloride salts and quaternary ammonium compounds thereof, it is readily apparent that other salts or quaternary ammonium compounds may be prepared in accordance with methods well known in the art.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

We claim:
1. N-(diethylaminomethyl)benzilic amide.
2. N-(dipropylaminomethyl)benzilic amide.
3. N-(1'-pyrrolidylmethyl)benzilic amide.
4. N-(1-piperidylmethyl)benzilic amide.
5. N-(2,6-dimethyl-1-piperidylmethyl)benzilic amide.
6. A compound of the structure

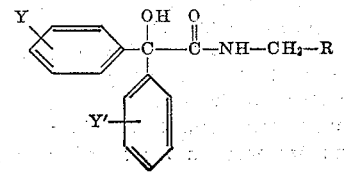

wherein Y and Y' are radicals selected from the group consisting of hydrogen, halogen, and lower alkyl radicals and R is a radical selected from the group consisting of di-lower alkyl amino, 1-pyrrolidyl, 1-piperidyl, and 2,6-di-lower alkyl-1-piperidyl.

References Cited in the file of this patent

UNITED STATES PATENTS

| 2,009,144 | Miescher | July 23, 1935 |
| 2,733,256 | Krapcho | Jan. 31, 1956 |

FOREIGN PATENTS

| 284,440 | Germany | May 25, 1915 |
| 438,659 | Great Britain | Nov. 15, 1935 |

OTHER REFERENCES

Fraenkel et al.: J. Am. Chem. Soc., August 1948, vol. 70, pp. 2673–2684.